July 16, 1929.  F. KIRK  1,721,125
PISTON RING ASSEMBLY
Filed Jan. 21, 1928
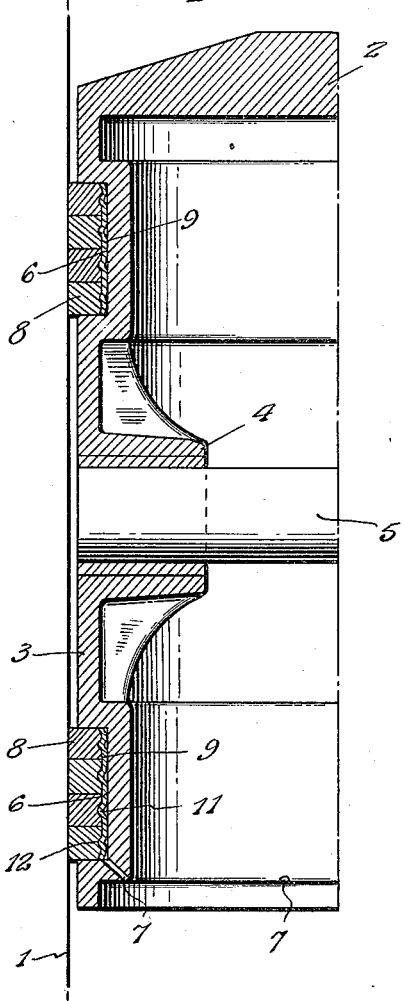
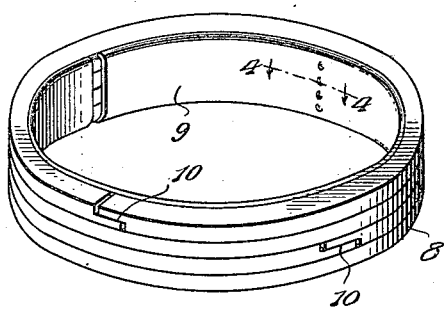
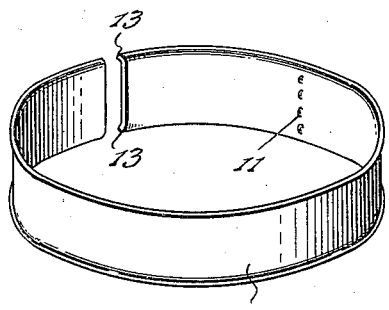
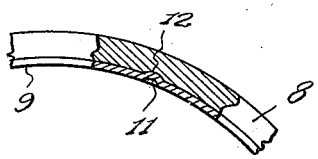
Inventor
Fred Kirk.
By Lacey & Lacey, Attorneys Patented July 16, 1929.

1,721,125

UNITED STATES PATENT OFFICE.

FRED KIRK, OF ZANESVILLE, OHIO, ASSIGNOR, BY DIRECT AND MESNE ASSIGNMENTS, OF ONE-HALF TO JOHN C. MATESICH AND ONE-HALF TO JESSIE B. KIRK, BOTH OF ZANESVILLE, OHIO.

PISTON-RING ASSEMBLY.

Application filed January 21, 1928. Serial No. 248,397.

In the operation of explosive engines, such as conventionally designated internal combustion, it is desirable and highly important that a tight joint be maintained between the cylinder and piston walls and that metallic packing be employed because not affected by heat and because self-expansible to preserve a close joint and prevent loss of pressure and the passing of oil by the piston.

It is also advantageous to provide a metallic packing of a composite nature comprising a plurality of individual elements, each being self-expansible, arranged to break joints and mounted upon a carrier which is likewise expansible, means being provided to hold the parts in predetermined position and the joints disalined to prevent the formation of a direct passage for the oil and the escape of pressure.

The invention contemplates a composite assembly including a plurality of metallic packing rings arranged one upon the other and an expansible carrier having the packing rings mounted thereon, the marginal edges of the carrier being outturned and engaging beveled portions of the outermost packing rings to retain the parts in assembled relation. Interengaging means are provided between the metal packing rings and the carrier to hold the parts in the required position and with the joints out of line.

The invention provides a packing assembly in which the ring elements are duplicates, hence interchangeable and adapted to occupy a relative position, thereby facilitating the assembling. Moreover, the packing as a whole can be handled as a unit when adjusting it to the piston and obviating the necessity of handling each individual element.

While the drawing illustrates a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a central, longitudinal, sectional view of a piston provided with metallic packing embodying the invention, one-half of the piston being omitted and the adjacent wall of the cylinder being indicated by a straight line.

Figure 2 is a perspective view of a packing assembly.

Figure 3 is a perspective view of the expansible carrier for receiving and supporting the packing ring elements.

Figure 4 is a fragmentary sectional view on the line 4—4 of Figure 2.

Figure 5 is an enlarged fragmentary sectional view of the carrier and packing comprising the assembly.

Corresponding and like parts are referred to in the following description and designated in the several views of the drawing by like reference characters.

The numeral 1 denotes the wall of a cylinder in which the piston is adapted to operate. The piston illustrated comprises a body including a head 2, and a skirt or shell 3 from which bosses or hubs 4 project inwardly from diametrically opposite points to receive the usual wrist pin 5. Annular grooves 6 are formed in the outer side of the body of the piston adjacent its ends and provide seats for reception of the metal packing. The annular groove or seat 6 adjacent the open end of the piston body has openings 7 leading therefrom through the inner wall of the skirt or shell 3, whereby to direct and return surplus oil back into the cylinder.

Each of the piston grooves or seats 6 is adapted to receive a metal packing of the nature embodying the invention. This packing consists of an assembly or composite unit, as show most clearly in Figure 2 of the drawings. The packing includes a plurality of elements 8 mounted upon a carrier 9. The elements 8 consist of metallic rings which are split and expansible. The ends of a ring bordering upon the split are constructed to lap, as indicated at 10 in Figure 2, thereby preventing the formation of a direct passage for the escape of pressure and oil. The packing rings 8, when assembled, are arranged to break joint, as indicated most clearly in Figure 2 of the drawings. Interengaging means are provided between the carrier 9 and the packing rings 8 to hold the latter in predetermined position with the overlapping joints 10 disalined. As indicated most clearly in Figure 4 of the drawings, portions of the carrier 9 are pressed outwardly to form projections 11 which are adapted to enter corresponding depressions 12 formed in the inner side of the packing rings 8. In this manner the parts are maintained in predetermined position when assembled.

The carrier 9 consists of a broad ring of light metal which is split and expansible. The marginal edges of the carrier 9 are outturned, as indicated at 13 to form retaining elements to hold the packing rings 8 upon the carrier against possible displacement. The inner sides of the outermost or end packing rings 8 are beveled, as indicated at 14, to receive the outturned edge portions 13 of the carrier 9, as indicated most clearly in Figure 5 of the drawings. It is observed that the assembly may comprise any number of packing rings 8 and the same may be of any determinate width, it being preferred to construct the packing rings of uniform width to facilitate assembling and minimize the cost of production. The packing consists of an assembly, or composite unit, as indicated most clearly in Figure 2 of the drawing, and may be handled as such when applied to the piston, thereby obviating the necessity of handling a plurality of parts. The assembly will of course be provided in different sizes to meet varying requirements of the trade and conditions, it being understood that the packing when seated in the piston groove fills the same and projects slightly beyond the outer wall of the piston, as indicated in Figure 1. Both the carrier and the packing rings being expansible, they mutually cooperate to preserve a close joint between the packing and the walls of the cylinder, as will be readily appreciated.

Having thus described the invention, I claim:

1. A composite piston packing comprising a metallic split ring forming a carrier and having its marginal edges outturned to provide retaining elements, and a plurality of metallic packing rings mounted upon the carrier and arranged to break joint, the inner sides of the end packing rings being bevelled to conform to the retaining elements of the carrier, and interengaging means between the carrier and packing rings consisting of projections pressed outwardly from the carrier and recesses formed in the packing rings to receive the said projections.

2. A composite piston packing comprising an expansible carrier ring of light metal having portions pressed outwardly to form projections and a plurality of like split metal packing rings mounted upon the carrier ring and arranged to break joint, and formed with depressions to receive the respective projections of the carrier ring to hold the parts in determinate position with the joints disalined.

In testimony whereof I affix my signature.

FRED KIRK. [L. S.]